United States Patent
Bobbitt et al.

(10) Patent No.: US 8,095,595 B2
(45) Date of Patent: *Jan. 10, 2012

(54) SUMMARIZATION OF IMMERSIVE COLLABORATION ENVIRONMENT

(75) Inventors: Lisa Louise Bobbitt, Carry, NC (US); Gregory Dean Pelton, Raleigh, NC (US); William Henry Morrison, IV, Carry, NC (US); Jonathan Gregory Rossie, Jr., Holly Springs, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/112,717

(22) Filed: Apr. 30, 2008

(65) Prior Publication Data

US 2009/0276492 A1    Nov. 5, 2009

(51) Int. Cl.
*G06F 15/16* (2006.01)
(52) U.S. Cl. .................. 709/204; 709/205
(58) Field of Classification Search .............. 709/204, 709/205, 206, 207; 715/512; 348/14.09
See application file for complete search history.

(56) References Cited

U.S. PATENT DOCUMENTS

| | | | |
|---|---|---|---|
| 5,987,401 A | 11/1999 | Trudeau et al. | |
| 6,092,048 A | 7/2000 | Nakaoka | |
| 7,069,192 B1 | 6/2006 | Freitag | |
| 7,792,829 B2 | 9/2010 | Brill et al. | |
| 7,865,382 B2 | 1/2011 | Menon et al. | |
| 2003/0125927 A1 | 7/2003 | Seme | |
| 2004/0117449 A1* | 6/2004 | Newman et al. | 709/206 |
| 2004/0128350 A1 | 7/2004 | Topfl et al. | |
| 2004/0250201 A1* | 12/2004 | Caspi | 715/512 |
| 2005/0027800 A1* | 2/2005 | Erickson et al. | 709/204 |
| 2005/0165624 A1 | 7/2005 | Shelton et al. | |
| 2005/0264648 A1* | 12/2005 | Ivashin et al. | 348/14.09 |
| 2006/0069726 A1* | 3/2006 | McKibben et al. | 709/204 |
| 2006/0136441 A1 | 6/2006 | Fujisaki | |
| 2007/0016647 A1* | 1/2007 | Gupta et al. | 709/206 |
| 2007/0130257 A1* | 6/2007 | Bedi et al. | 709/204 |
| 2008/0052358 A1* | 2/2008 | Beaven et al. | 709/205 |
| 2008/0222295 A1 | 9/2008 | Robinson et al. | |
| 2008/0281922 A1* | 11/2008 | Renshaw et al. | 709/206 |
| 2008/0301232 A1* | 12/2008 | Facemire et al. | 709/205 |
| 2009/0119368 A1* | 5/2009 | O'Sullivan et al. | 709/204 |
| 2009/0119604 A1 | 5/2009 | Simard et al. | |
| 2009/0222742 A1 | 9/2009 | Pelton et al. | |
| 2009/0251457 A1 | 10/2009 | Walker et al. | |

OTHER PUBLICATIONS

Second Life. Dec. 29, 2008. <www.secondlife.com>.
Kirsh, D. "Adaptive Rooms, Virtual Collaboration." Dec. 29, 2008. <http://interactivity.ucsd.edu/articles/CoopBuildings/published-version.html>.

(Continued)

*Primary Examiner* — Le Luu
(74) *Attorney, Agent, or Firm* — Schwegman, Lundberg & Woessner, P.A.

(57) ABSTRACT

A system (and corresponding method) that enables automatic (and/or manual) summarization of significant events that occur within a collaborative discussion is provided. The summarization promotes efficient review and asynchronous participation where a user can trigger playback of a series of events that occurred within a discussion. The system can automatically summarize 'high points' or significant events from within an immersive collaborative environment. 'World-marks' or other tags can be employed to mark, locate and/or render the summarized content.

20 Claims, 10 Drawing Sheets

OTHER PUBLICATIONS

Voida, S., Mynatt, E.D., MacIntyre, B. "Supporting Collaboration in a Context-Aware Office Computing Environment."

PCMag. Dec. 29, 2008. <http://www.pcmag.com/article2/0,2817,417141,00.asp>.

IBM. Sametime. Dec. 29, 2008. <http://publib.boulder.ibm.com/infocenter/sametime/v7r5m1/index.jsp?topic=/com.ib>.

Digital Space. Avatars. Dec. 29, 2008. <http://www.digitalspace.com/avatars/book/chus/chus1.htm>.

HP. Virtual Rooms. Dec. 29, 2008. <http://h10076.www1.hp.com/education/hpvr/hpvr_orderfaq.htm>.

Microsoft. Live Meeting 2007. Dec. 29, 2008. <http://office.microsoft.com/en-us/livemeeting/FX102425331033.aspx>.

Greenhalgh, C., Flintham, M., Purbrick, J., Benford, S. "Applications of Temporal Links: Recording and Replaying Virtual Environments."

Geyer, W., Richter, H., Abowd, G. "Making Multimedia Meeting Records More Meaningful.", Sep. 2003, pp. 669-672.

Chernich, R., Hunter, J., Davies, A. "VIRGIL—Providing Institutional Access to a Repository of Access Grid Session."

AMI Consortium. Dynamic Summarization Overview. Dec. 29, 2008. <www.amiproject.org/showcase/audio-speec h-processing/dynamic-summarization.>

Jatowt, A., Ishizuka, M. "Web Page Summarization Using Dynamic Content.", May 22, 2004, pp. 344-345.

"The Future in Gear" [online]. pcmag.com, Sep. 3, 2002. Retrieved from the Internet: <URL: http://www.pcmag.com/article2/0,2817,417141,00.asp >, 18 pgs.

Geyer, W., et al., "Making multimedia meeting records more meaningful", Proceedings of the 2003 International Conference on Multimedia and Expo (ICME '03), vol. 2, Baltimore, Maryland, Jul. 6-9, 2003, 669-672.

Greenhalgh, C., et al., "Applications of temporal links: recording and replaying virtual environments", Proceedings of the IEEE Virtual Reality Conference 2002 (VR 2002), Orlando, Florida, Mar. 24-28, 2002, 8 pgs.

Voida, S, et al., "Supporting Collaboration in a Context-Aware Office Computing Environment", 4th International Conference on Ubiquitous Computing (UbiComp 2002), Gothenburg, Sweden, (2002), 19 pgs.

Alarcon, Rosa, et al., "Intelligent Awareness in Support of Collaborative Virtual Work Groups", Lecture Notes in Computer Science, (2002), 1, 3-4.

* cited by examiner

SUMMARIZATION OF IMMERSIVE COLLABORATION ENVIRONMENT

BACKGROUND

Virtual Reality (VR) refers to a technology which allows a user to interact within a computer-simulated environment. Generally, this computer-simulated environment can relate to a real or imagined scenario. Current VR environments are primarily visual experiences which are displayed either via a monitor or through specialized stereoscopic displays (e.g., goggles). In addition to visual effects, some simulations include additional sensory information, for example, audible or vibratory sensations. More advanced, 'haptic' systems now include tactile information, generally known as 'force feedback,' in many gaming applications.

Today, users most often interact with a VR environment by way of standard input devices such as a keyboard, mouse, joystick, trackball or other navigational device. As well, multimodal devices such as a specialized haptic wired glove are used to interact with and within the VR environment.

Recent developments in VR have been directed to three-dimensional (3D) gaming environments. Generally, a 'virtual world' is a computer-based simulated environment intended for its users to inhabit and interact via avatars. An 'avatar' refers to a representation of a user usually employed by way of a computer network to depict a user. An avatar can be a 3D model used in computer games, a two-dimensional image (e.g., icon) used within Internet and other community forums (e.g., chat rooms) as well as text constructs usually found on early systems. Thus, presence within the 3D virtual world is most often represented in the form of two or 3D graphical representations of users (or other graphical or text-based avatars).

Today, nature and technology are equally integrated into 3D virtual worlds in order to enhance the reality of the environment. For example, actual topology, gravity, weather, actions and communications are able to be expressed within these virtual worlds thereby enhancing the reality of the user experience. Although early virtual world systems employed text as the means of communication, today, real-time audio (e.g., voice-over-Internet Protocol (VoIP)) is most often used to enhance communications.

Although the technological advances in graphics and communications have vastly improved the quality of the virtual worlds, these virtual environments have been centered around the gaming industry. As such, users control actions and the system is preprogrammed with responses to those actions.

Somewhat similar to VR, 'Augmented Reality' (AR) most often relates to a field of computer research that describes the combination of real world and computer generated data. Conventionally, AR employs with the use of video imagery which is digitally processed and 'augmented' with the addition of computer-generated graphics. Traditional uses of AR (and VR) have been primarily focused around the gaming industry.

Most often, conventional AR systems employed specially-designed translucent goggles. These goggles enable a user to see the real world as well as computer-generated images projected atop of the real world vision. These systems attempt to combine real world vision with a virtual world. Unfortunately, traditional systems fall short in their ability to leverage the vast amount of information and data now available to users.

DESCRIPTION

Overview

Figure 1:
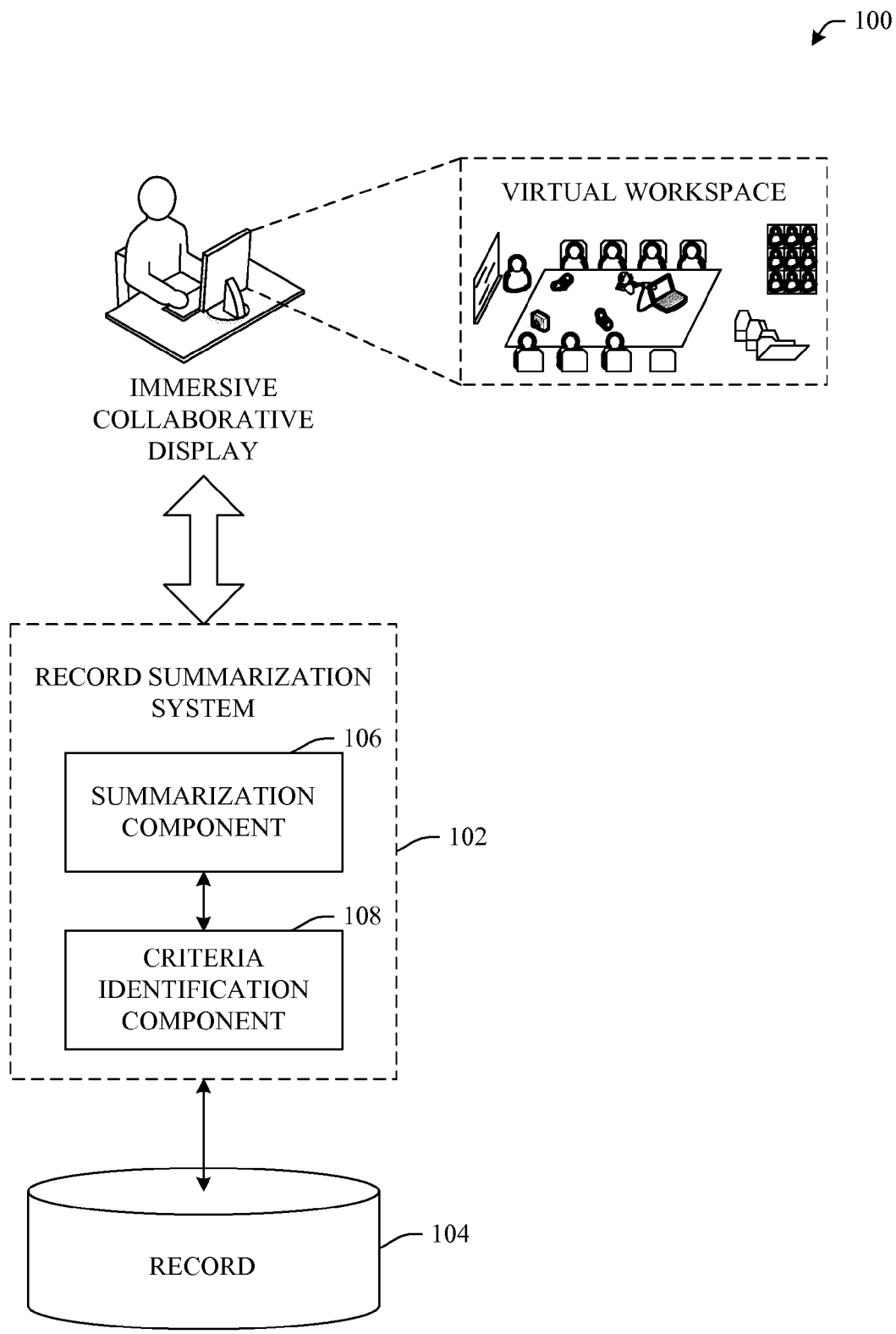
FIG. 1 illustrates an example record summarization system that employs a summarization component and a criteria identification component to effect summarization of virtual workspace events in accordance with an aspect of the specification.

The following presents a simplified overview of the specification in order to provide a basic understanding of some example aspects of the specification. This overview is not an extensive overview of the specification. It is not intended to identify key/critical elements of the specification or to delineate the scope of the disclosure. Its sole purpose is to present some concepts of the specification in a simplified form as a prelude to the more detailed description that is presented later.

The disclosure relates to an ability to automatically summarize significant events that occur within an immersive collaborative discussion. The summarization promotes efficient review and asynchronous participation where a user can trigger playback of a series of events that occurred within a discussion. Here, the innovation can automatically summarize 'high points' or significant events. In examples, 'worldmarks' or other tags can be employed to mark, locate and/or render the summarized content.

This specification discloses appropriate technology and processes that create the paradigm shift that moves real-life enterprises into the immersive world, which was traditionally reserved for three-dimensional (3D) gaming technologies. These systems integrate data in an immersive collaboration environment and provide for activating changes in behaviors of persons—awareness is critical to efficiency and productivity. Accordingly, as a record of activities within an immersive collaborative environment can be established, the innovation provides for systems and methods to summarize the record such that a user can quickly review and access useful information.

More particularly, aspects of the specification provide components (and corresponding methodologies) that can assess factors within a record (e.g., time-based record) of activities and thereafter mark significant events and/or generate a summary as a function of the factors. Specific examples establish factors based upon content of the record, for example, project scope. Other examples employ contacts (e.g., presence) to establish the summary. Yet other aspects employ context generally to establish an appropriate summary and/or to mark events.

In addition to considering factors such as content, contacts and context when marking and/or establishing the summarization events, still other aspects consider characteristics and criteria associated with the target audience. For example, user identity can be incorporated into a determination of the scope and/or details (among other criteria) to include within a particular summary as well as a determination (or inference) of significant events.

Yet other aspects include an ability to configure and render playback of the summary to a user. This playback can be identity-specific so as to conform to a user's preferences, role, etc. Most all functionality of the innovation can employ machine learning and reasoning mechanisms to effect inferences and actions on behalf of a user. For example, the system can infer what a user would consider useful or important based upon past actions and preferences.

Aspects of the specification disclose a manner by which a user can manually generate 'world-marks' within a collaborative discussion. These dynamic world-marks are essentially tags or bookmarks that highlight content or events of interest within a collaborative discussion. Once marked, a user can easily return to this point in time within a collaborative discussion for future review, to append material or possibly to change material after further research. Additionally, the system can learn from a user's actions and begin to automatically (or implicitly) mark items that may be of interest to the user. Similarly, the system can tag events that may also be of interest to others within the same or similar virtual workspace.

To the accomplishment of the foregoing and related ends, certain illustrative aspects of the specification are described herein in connection with the following description and the annexed drawings. These aspects are indicative, however, of but a few of the various ways in which the principles of the specification can be employed and the subject specification is intended to include all such aspects and their equivalents. Other advantages and novel features of the specification will become apparent from the following detailed description of the specification when considered in conjunction with the drawings.

BRIEF DESCRIPTION OF EXAMPLE EMBODIMENTS

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

'Virtual Reality' (VR) environments are often referred to as 'immersive environments.' However, conventional immersive environments often lack an implication that 'reality' is being simulated within a digital space. In accordance with embodiments of the specification, an immersive environment can be a model of reality, as well as a complete fantasy user interface (UI) abstraction where the user of the environment is virtually immersed within it. Essentially, the term 'immersion' suggests that a user experiences a presence within the virtual environment. The success with which an immersive environment can actually immerse a user is dependent on many factors such as believable graphics (two-dimensional (2D), two & a half-dimensional (2½D) and three-dimensional (3D)), sound, interactive user engagement, among others.

This specification discloses a system that can enable a user to tag significant events that occur within an immersive collaborative environment. Other aspects disclose automatic tagging of events based upon inferences as well as policy/preference-driven determinations. As well, the system can enable a summary of significant events to be established and rendered to a user. This summary of significant events assists users in reviewing portions of the record without having to review the entire record. In examples, summaries of relevant portions of the record can be established as a function of a user identity which, in addition to digital identity can include factors such as occupation, role, capacity, location, time of day as well as other contextual factors.

Referring initially to FIG. 1, a system 100 that enables immersive collaborative record summarization in accordance with aspects is shown. The disclosure that follows focuses on at least two general concepts of summarization. First, the system 100 can enable real-time or near real-time establishment (automatic and manual) of tags that mark significant events (or events of interest) that occur within a virtual workspace or immersive collaborative environment. These significant events can be marked manually by a user or inferred on behalf of a user based upon most any factor, including but not limited to, content, contacts and context.

Secondly, the system 100 can also enable a captured record to be summarized such that a user would not have to review the entire record to get the gist or substance of a meeting that occurred within an immersive collaborative environment. For example, suppose a manager who was unable to attend a meeting wanted to review the record, the system 100 enables that record to be automatically summarized (e.g., tagged, marked . . . ) so as to highlight significant events thereby alleviating the manager of the task of reviewing the complete record. As will be described below, the summarization can be based upon the identity of a viewer, in this example, the 'manager.' Thus, significant events can be selected as a function of what would or may be considered of interest or relevant to a 'manager' or this particular manager. As will be understood, relevance, significance or interest can be established based upon content, contacts and context as a function of a viewer's identity.

Generally, system 100 can include a record summarization system 102 that communicates with a record 104. As described above, the record summarization system 102 enables automatic and/or manual identification of significant events. Additionally, the record summarization component 102 facilitates efficient record review by automatically selecting significant (or otherwise notable) portions of the record based upon content, contacts, or context, among other criteria. The automatic selection can greatly reduce the amount of time necessary for a viewer to review the record of a virtual workspace.

As illustrated in FIG. 1, the record summarization system 102 can include a summarization component 106 and a criteria identification component 108. Together, these two components enable identification of factors and parameters related to a virtual workspace session as well as summarization of the determined significant events of the same.

It is to be understood that the record 104 can be structured and formatted in most any appropriate, suitable or desired manner so as to capture events from a virtual workspace or immersive collaborative environment. In one aspect, the time-based record 104 can be structured in an 'onion' or blog-type manner such that later events are stacked upon the earlier events. In other words, in order to review the record of a virtual workflow, a user can drill down from the most recent time to the earliest time within the record. Also, as used herein, a 'record,' 'time-based record' or 'time-based historical record' (e.g., 104) can refer to a sequential data set that can include text, audio, video, user comments, records of consensus and other data and events that document collaborative discussion with a virtual workspace environment.

In operation, the record summarization component 108 can monitor actions, discussions, data accesses, etc. that take place within a virtual workspace and can automatically generate (or effect manual selection of) tags (e.g., 'world-marks') that represent events, data, etc. that are significant, relevant or may be of interest. Essentially, these tags or markers can be employed to provide a summary to a user upon subsequent review of the record 104.

While many of the aspects and embodiments described herein are directed to business or enterprise workflows, it is to be understood that most any activity- or subject-based activity/action can effected by way of an immersive collaborative display. Thus, a record 104 and corresponding summary can be established. These alternative aspects are to be included within the scope of the innovation and claims appended hereto.

As shown in FIG. 1, it is to be understood that the virtual workspace can be representative of most any workflow, action, activity event or group of events. In a specific example, an immersive virtual world can be designed to represent a business or enterprise environment. While there are many possible metaphors that could be used to describe the display, one manner in which to describe the display is a collection of 'rooms' or 'spaces.' It is to be understood that, in aspects, spaces or rooms can be representative of buildings, theme-based rooms (e.g., office, lobby, living room), landscapes or other visual representations. In some examples, users are represented in the environment as avatars that occupy the spaces or rooms. It is to be understood that the rooms can be geographically and/or visually distinct from each other. For example, each room can represent a particular business context—e.g., construct that is representative of something from the business domain. For instance a room might represent an office, a department, a project, a process, an organization, a work product, a task, etc.

Ultimately the geography and structure of the world or environment rendered captures elements of the context (e.g., business context) it is supporting. Effectively, the user (or groups of users) can be depicted in the display as performing business tasks while in the virtual world. These tasks may include such tasks as working with specific documents, attending meetings or collaborating with others. The tasks may be directly supported by the virtual world or may be in adjacent workspaces.

As the user performs a task, the geography or special representation in the virtual world can adjust and reconfigure itself to provide context specific assistance to the user. One illustration of this would be a user writing a document about a product design. Here, as the user types or scrolls through the document, they could see new pictures hanging on the wall of their virtual room that represent prevalent themes in the document. Additionally, they may also be presented with objects on the floor that represent common reference material like a dictionary, a design process document, etc. Other documents related to the product, schematics, etc. may appear as files on a virtual table or presentation screen.

It is to be understood and appreciated that there are a multiplicity of different potential representations that support the visual metaphor of the virtual world and rooms. As such, these multiplicities of different representations are to be included within the scope of the specification and claims appended hereto. As described supra, the record 104 depicts a chronological representation of the activities (and associated resources) that occur within a virtual workspace. In order to provide an efficient manner in which to view or review the record 104, the record summarization system 102 enables portions of the record to be tagged based upon an inferred and/or determined relevance, significance, interest, etc. Additionally, the record summarization system 102 enables a summary to be generated from the tags or marks thereby affording a user an ability to target portions of the record 104 without having to review the record 104 in whole.

While the aforementioned discussion provides an overview perspective of a virtual world or immersive collaborative environment, the subject specification discloses mechanisms by which a time-based record 104 of events and activities within the environment can be summarized based upon significant, relevant or interesting events. These marked portions of the record 104 can be based upon an inference on behalf of a user, based upon a pre-defined policy/preference or, alternatively, manual selection by a user. Other features, functions and benefits of the subject specification are described with reference to the figures that follow.

Figure 2:
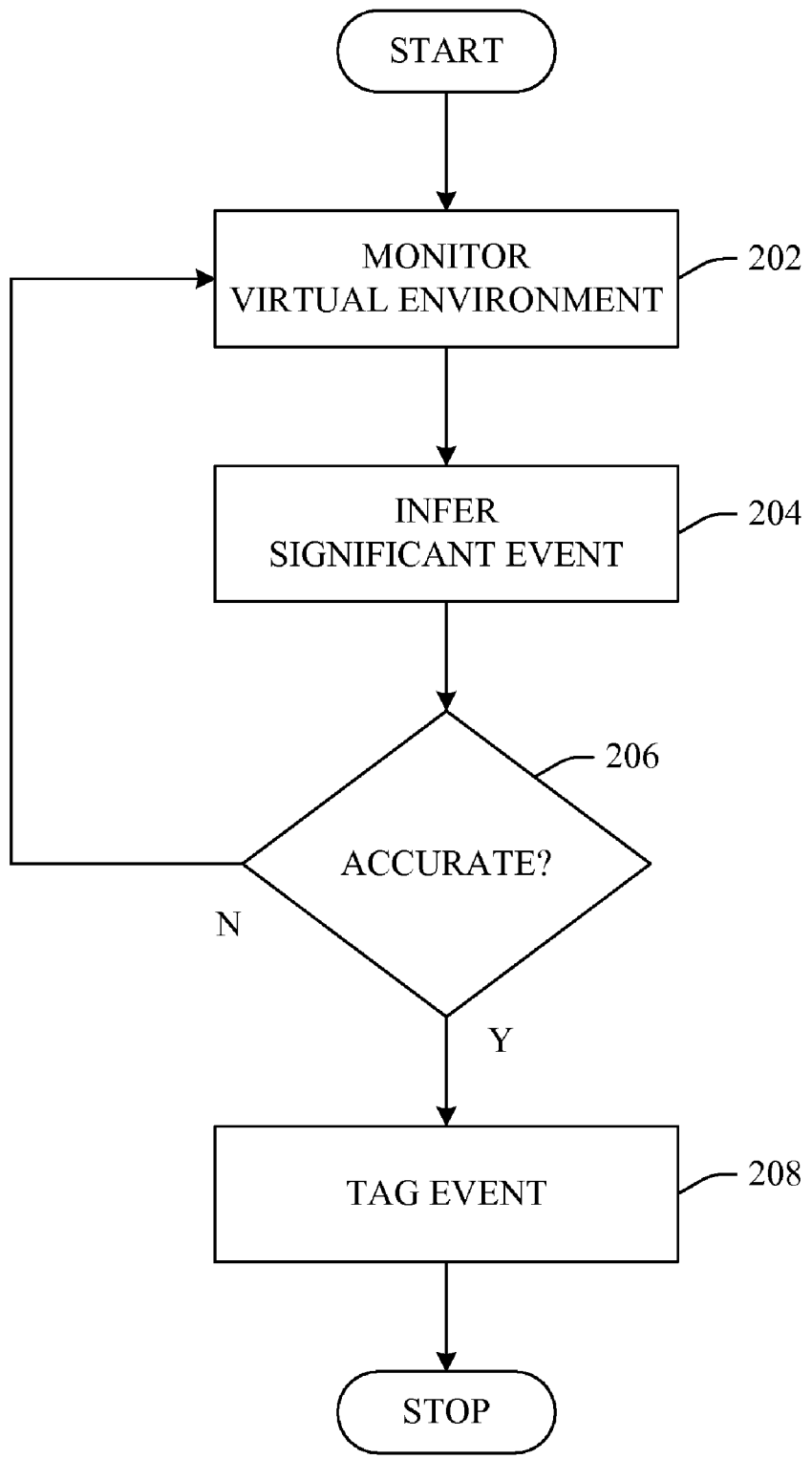
FIG. 2 illustrates an example flow chart of procedures that facilitate marking events for summarization in accordance with an aspect of the disclosure.
Figure 3:
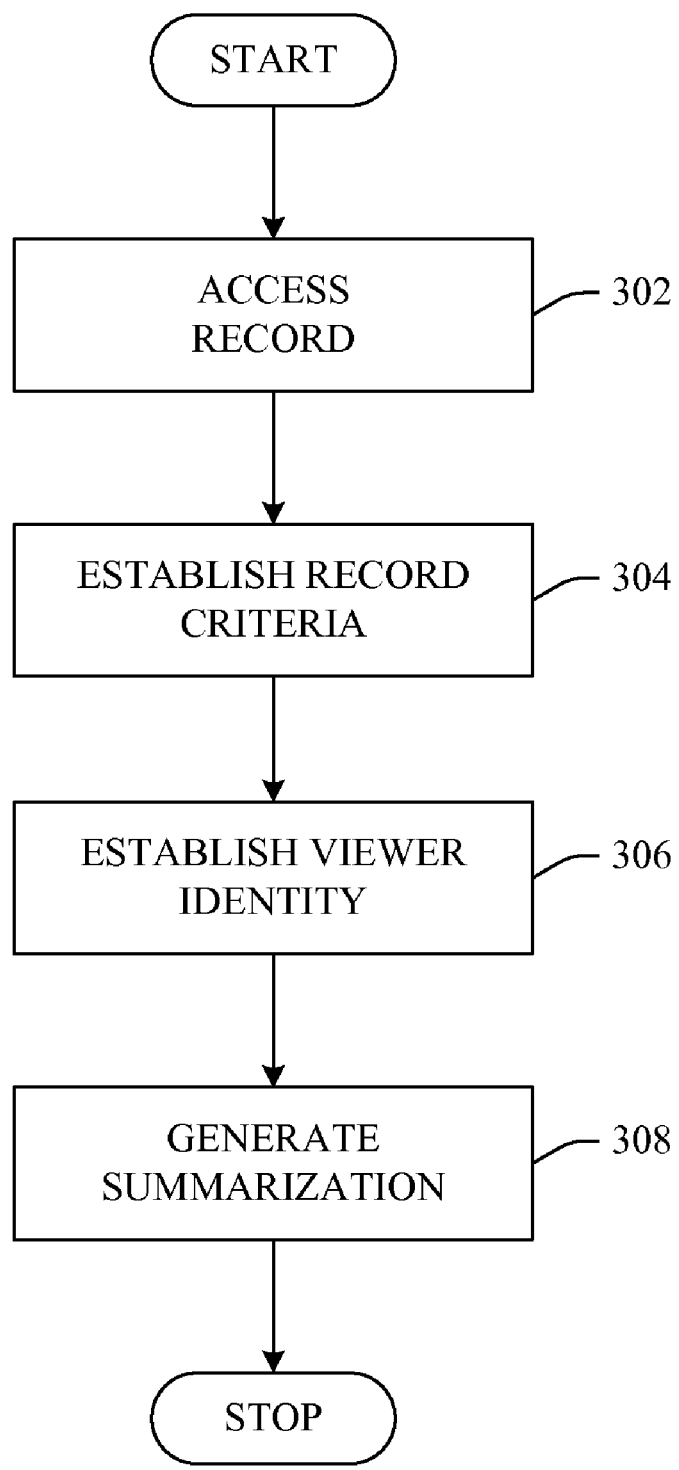
FIG. 3 illustrates an example flow chart of procedures that facilitate generation of a summarization in accordance with an aspect of the disclosure.

FIGS. 2 and 3 illustrate example methodologies of establishing a summary of record of events/activities in accordance with an aspect of the specification. Generally, the methodology of FIG. 2 enables tagging of events, for example, significant or relevant events associated with a virtual workspace or environment. These tags can be incorporated into a record or chronologic history of actions/activities associated with the environment. FIG. 3 illustrates an example methodology of establishing a summary from a previously captured record. It is to be understood that the record need not include event tags in order to establish a summary from the record.

While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification Referring to FIG. 2, at 202, a virtual environment is monitored. In other words, activities and events within a virtual workspace or immersive collaborative environment are monitored at 202, in real- or near real-time. For example, content, actions, data accesses, individuals present (e.g., presence), conversations, consensus discussed/reached, context, etc. can be monitored. As will be understood, the granularity of the monitoring is user definable or defined by the system automatically on behalf of a user. Most any factor, parameter or criteria can be employed to monitor the workspace or environment as well as to determine, or infer, an appropriate monitoring granularity.

At 204, significant (e.g., relevant events, events of interest) are inferred on behalf of a user. Here, analysis of content, contacts and context can be employed to infer these events or portions of the record. Similarly, the inference can be made based upon or as a function of identity of a user. In aspects, 'identity' can refer to most any user identification including but not limited to, digital identity, physiologic identity, role, knowledge level, experience level, or the like. As is to be appreciated, this 'identity' information can enhance accuracy of identification of significant or otherwise interesting information.

A determination is made at 206 to establish if the inference is accurate. In other words, a determination is made to establish if the inferred information should actually be considered relevant or significant to the user. If not accurate, the methodology returns to 202 to continue monitoring the virtual environment. However, if the inference is deemed accurate, the event can be tagged at 208 for use in establishing a summary for the user. In one example, this tag can be employed to index the event in a record for future review.

At 208, the event is tagged or otherwise prepared for index, storage and subsequent summarizing. As will be appreciated, most any tagging scheme can be employed to accomplish a comprehensive summarization or summation mechanism. In one aspect, the tags can be 'world-marks' that identify significant points or areas within the record of the virtual world. FIG. 3 illustrates an example methodology of establishing a summary from a captured record.

Turning now to FIG. 3, illustrated is an example methodology that facilitates establishment of a summary from a captured record that corresponds to a virtual workspace. It is to be understood that the record need not include pre-designated tags however, if available, the tags can be employed to facilitate efficient establishment of a summary of the record.

At 302, the record is accessed. As described above, the record can represent a time-based record of actions and/or events that occur within a virtual environment. In aspects, the record can be local, remote or distributed as desired or appropriate. Essentially, the record is most often a chronology of events that occur within a virtual environment.

Criteria from the record can be established at 304. For example, criteria such as content, contacts or context related to the record can be established. This criterion can be established using most any suitable techniques including, but not limited to, speech recognition, pattern recognition, keyword analysis, or the like. Identity of the viewer can be established at 306, wherein the user identity can be used to personalize a summarization of the record. However, it is to be understood that the personalization based upon identity is optional. Thus, alternative aspects exist that establish a summary solely based upon the established criteria and not the identity of the viewer.

A summarization can be generated at 308, for example via a summarization component 106 of FIG. 1. As described supra, the summarization can be structured and/or formatted in most any manner that conveys a synopsis, abstract or overview of the recorded events from within a virtual environment. While pre-inserted tags are not a prerequisite of generating a summary, it can be understood that these tags can enhance the efficiency and/or accuracy of establishing a summary in accordance with aspects of the innovation.

As stated above and as illustrated by FIG. 2, this disclosure describes mechanisms by which tags (e.g., world-marks) can be generated in real-time (or near real-time) by way of monitoring actions and events within a virtual environment. These aspects are directed to manners by which a user (or the system) can manually generate world-marks within a virtual workspace. These dynamic world-marks can essentially be tags or bookmarks that highlight content or events of interest within a virtual workspace. Once marked, a user can easily return to this point in time within a virtual space for future review, for example, to append material or possibly to change material after further research.

Additionally, the system can learn from a user's actions and begin to automatically (or implicitly) mark items that may be of interest to the particular user. Similarly, the system can tag events that may also be of interest to others within the same or similar virtual workspace.

Further, as illustrated in FIG. 3, the specification relates to an ability to automatically summarize significant events that occur within a virtual workspace. Here, the innovation can automatically summarize 'high points' or significant events from a captured record. In one example, world-marks or other tags can be employed to locate and/or render the summarized content.

Figure 4:
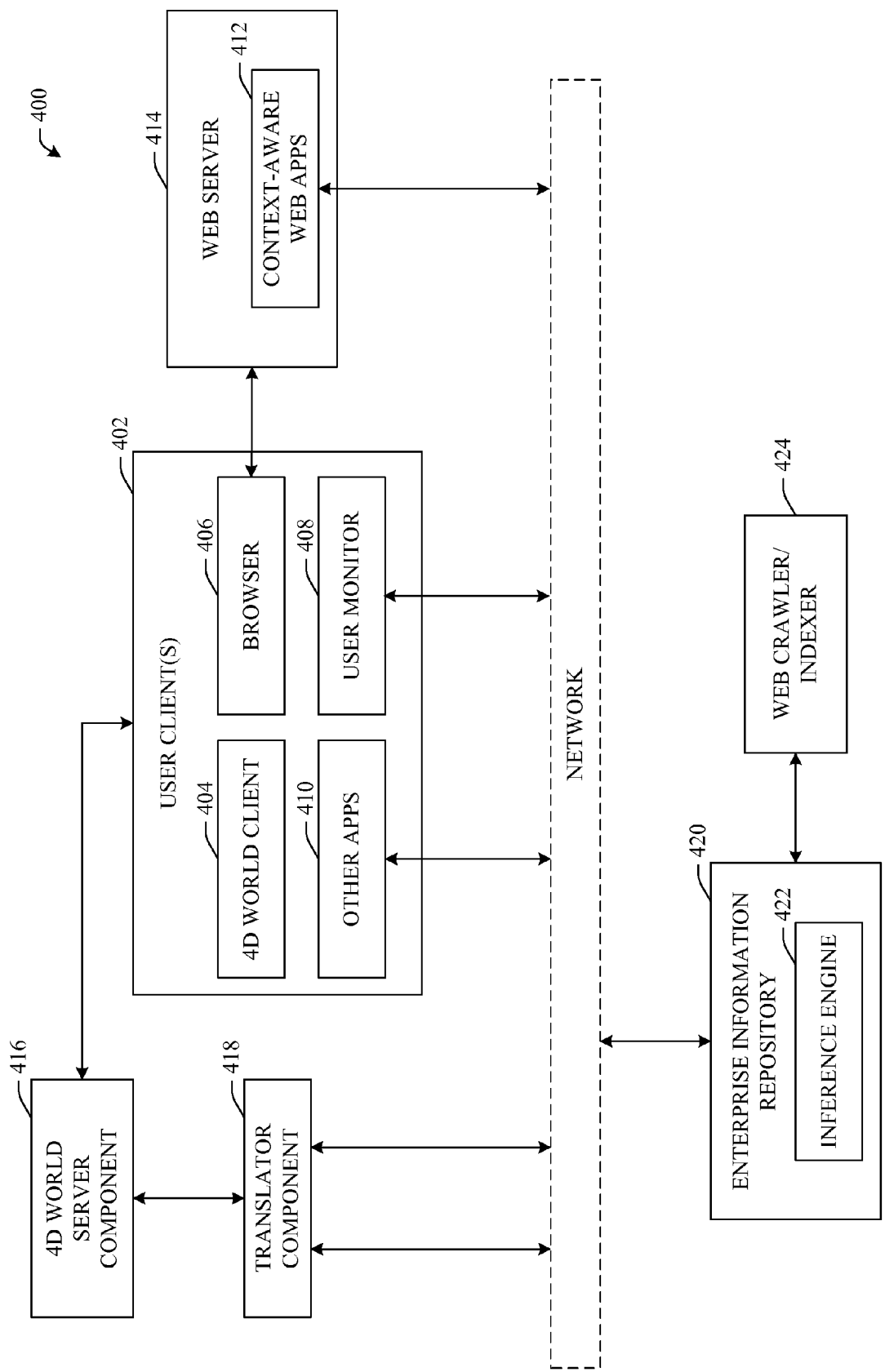
FIG. 4 illustrates an example block diagram of a high-level component system that facilitates immersive collaboration in accordance with embodiments of the specification.

Referring now to FIG. 4, an example block diagram of an immersive collaboration system 400 in accordance with an aspect of the specification is shown. While specific components are illustrated in FIG. 4, it is to be understood that alternative systems can be configured that possess the features, functions and benefits described herein. Thus, system 400 is included to add perspective to the general virtual workspace or immersive collaborative aspects of the specification and is not intended to limit the disclosure in any manner.

User clients 402 can include a 3D world client 404, a browser 406, a user monitor 408 and other applications 410. In operation, the user monitor 408 can observe contextual factors, including user context, activity context and environmental context. In accordance with a detected context, the 3D world client component 404 can render resources associated with such context. For example, links to other applications 410 can be provided by way of the 3D world client 404. Similarly, the browser 406 can be employed to provide access to context-aware web applications 412 employed within a web server 414.

A server-based 3D world server component 416 and translator component 418 can be provided as needed or desired to provide web based immersive collaborative features, functions and benefits. Still further, in accordance with the context, resources can be accessed by way of an enterprise information repository 420. Additionally, an inference engine 422 and web crawler/indexer 424 can be employed to assist in identification of relevant resources (e.g., data, people, links) or events. For instance, based upon statistical and/or historical analysis and heuristics, the inference engine 422 can establish relevance, or degrees of relevance, of the information or events. The web crawler/indexer 424 can be employed to identify information and other resources located upon a network, for example, the Internet.

As will be understood, system 400 can not only virtualize a user's desktop but, also their workspace as a whole. Essentially, the system can determine or infer where a user is located, what they are doing, what they are using, and who they are communicating with and automatically render a two-dimensional (2D), two and a half-dimensional (2½D) or three-dimensional (3D) immersive collaborative display. Generally, the specification fuses content, contacts and context in a manner that enables an immersive collaborative environment traditionally reserved for 3D gaming applications.

As described supra, a single view of a user's environment can be rendered and made available for others to others to join, work within, etc. The collaboration within this environment essentially makes resources (e.g., tools, data, contacts) available based upon a user's context. In operation, an avatar or other suitable representation can be used to symbolize the user within the virtual space.

Within this virtual space, data can be automatically and/or dynamically filtered and provided based upon most any relevant factors including, user activity, user role, user permission, user contacts in close proximity, etc. Similarly, as the system 400 can make this information available to a user in an effort to maximize efficiency, information from all users within a virtual space (e.g., room) can be saved or tagged in association with the room for subsequent use. As well, information can be stitched together so as to provide a cohesive and comprehensive rendition of the activity with a particular room.

One useful embodiment includes an ability to promote cross sharing of information based upon a particular context. As well, the system 400 can intelligently filter information such that a user is only presented with information useful at any moment in time. This information can be displayed via a virtual desktop which enables a view of real world resources within a technologically savvy virtual space.

Figure 5:
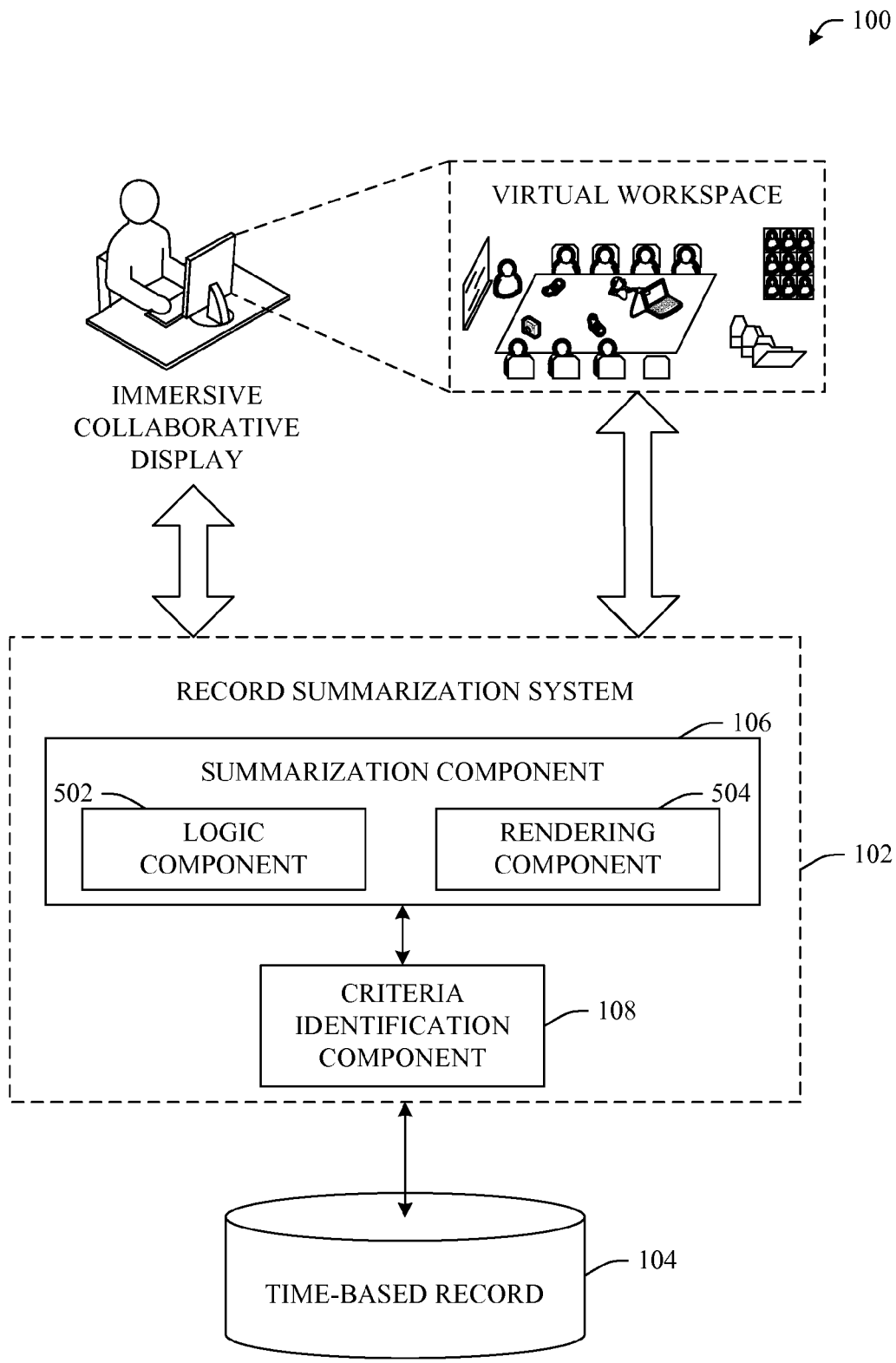
FIG. 5 illustrates an alternative block diagram of a record summarization system that employs a logic component and a rendering component in accordance with aspects of the specification.

Referring now to FIG. 5, an alternative block diagram of system 100 is shown. As illustrated, summarization component 106 can include at least two sub-components, namely, a logic component 502 and a rendering component 504 that facilitate generation and rendering of a summary in accordance with the specification.

The logic component 502 represents both inference-based and user-defined (e.g., pre-programmed-based) decision making logic. Additionally, the logic component 502 can enable a user to selectively override any inference or decision made on behalf of a user. The features, functions and benefits of these sub-components will be better described with reference to the figures that follow.

The rendering component 504 facilitates presentation of the summary to a viewer or other application. As well, the rendering component 504 enables a user to search the record thereby enabling summarization of the record or portion thereof. It will be understood upon a review of the figures that follow that the search can be effected based upon most any criteria including, but not limited to 'world-marks,' tags, keywords, etc.

Figure 6:
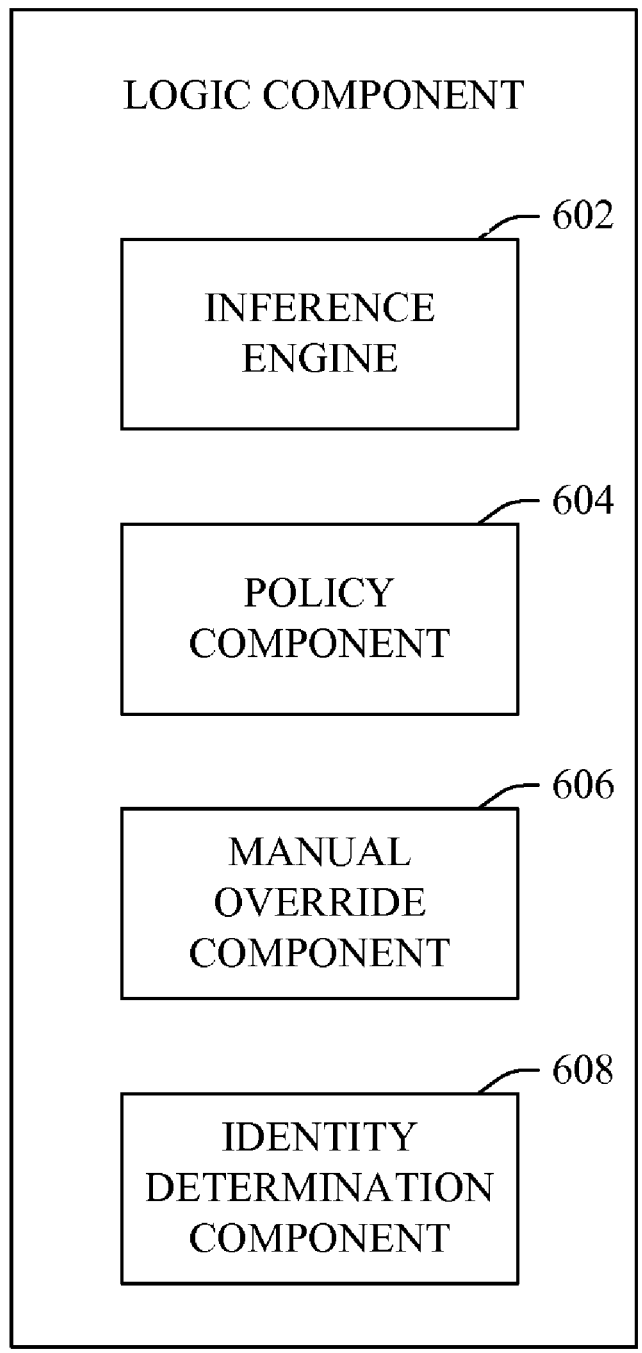
FIG. 6 illustrates an example block diagram of a logic component in accordance with aspects of the disclosure.

FIG. 6 illustrates an example logic component 502 that includes an inference engine 602, a policy component 604, a user selection override component 606 and an identity determination component 606. Each of these sub-components will be described in greater detail infra. While the example logic component 502 of FIG. 6 includes specific sub-components, it is to be understood and appreciated that other aspects can include additional or fewer sub-components than as illustrated. These alternative aspects are to be included within the scope of this disclosure and claims appended hereto.

The inference engine 602 can be employed to automatically establish markers, tags or world marks on behalf of a user. In other aspects, the engine 602 can be employed to automatically establish a summarization, for example in view of identity of the viewer, content of the record, etc. The engine 602 can employ most any machine learning and reasoning (MLR) mechanisms to automatically establish events that are relevant, significant or of interest. The inference engine 602 can consider content, contacts and context of the record in order to establish an appropriate summary. Following is a discussion of example MLR mechanisms that can be employed in connection with the inference engine 602, as well as other inferences described above.

As described supra, the specification suggests inference in lieu of (or in addition to) explicit decision making. Accordingly, the systems described herein can employ MLR components which facilitate automating one or more features in accordance with the subject specification. The subject specification (e.g., in connection with significant event inference) can employ various MLR-based schemes for carrying out various aspects thereof. For example, a process for determining how/if to select events (or portions thereof), how/when to tag events, how/when to summarize events, etc. can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject specification can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining if/when an event is significant, if/when to tag significant events, if/when to summarize events, etc.

In addition to, or in place of, the inference engine 602, the policy component 604 can be employed to effect pre-programmed rules and/or preferences. In other words, a user can program policies that include objective criteria for determining significance, relevance or interest of events. It is to be understood that policies (as well as inferences) can be used in proactive as well as reactive scenarios. In other words, suppose an inference is made to automatically generate a world-mark of an event—here, a policy can be used to automatically override the inference. Similarly, an inference can be used to override a policy where appropriate. Essentially, it is to be understood that both inferences and policies can be employed to prompt as well as to override any summarization actions in accordance with aspects of the specification.

As described above, a policy can be used to override an inference. Similarly, manual override component 606 enables a user to manually override a summarization action such as designation of a world-mark, tag or the like. It is to be understood that the manual override component 606 can represent an interface that enables a user to selectively override any inference- or policy-based summarization action.

The identity determination component 608 can be employed to establish identity of a viewer or user in accordance with aspects. As described above, 'identity' can refer to most any identifying criteria, including but not limited to, digital identity, biometric identity, role, capacity, or the like. As previously discussed, the 'identity' information can be used to effect inferences and automate action on behalf of a user. For example, a user 'identity' would be helpful in determining the depth or scope by which a summary should entail. A summary for a general manager would most likely not require the level of detail as a summary for a team leader or even a project team member. Thus, the 'identity' information can be used to establish significant events as well as scope/details associated therewith.

Figure 7:
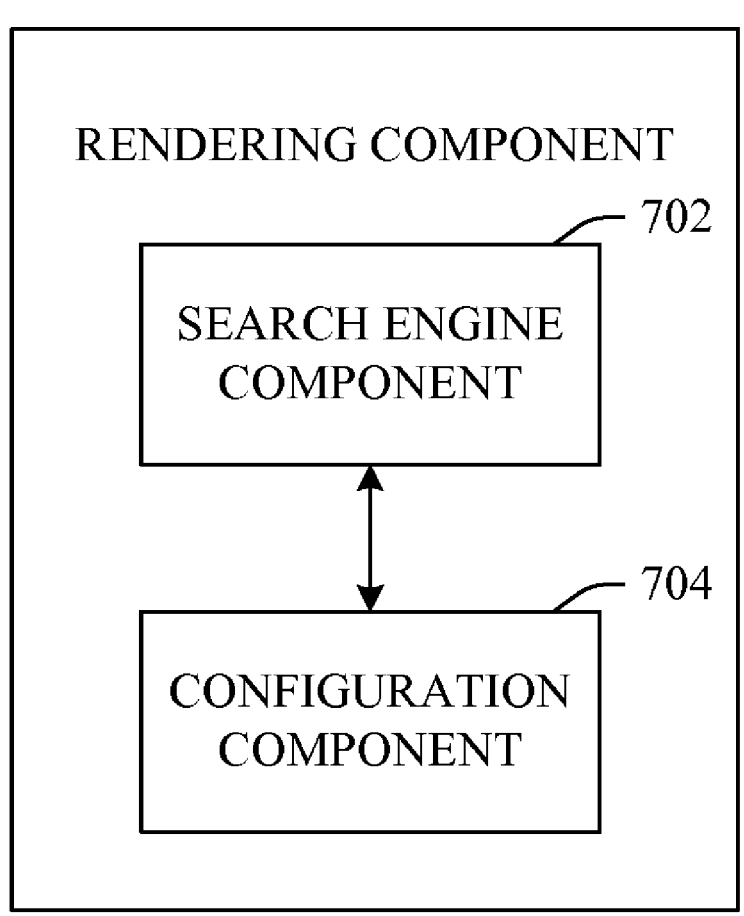
FIG. 7 illustrates an example rendering component that employs a search engine and a configuration component in accordance with an embodiment of the specification.

Referring now to FIG. 7, a block diagram of an example rendering component 504 is shown. Essentially, the rendering component 504 enables display and/or presentation of event summarization in accordance with aspects of the specification. As illustrated, the example rendering component 504 can include a search engine component 702 and a configuration component 704.

The search engine component 702 enables establishment of a query that can be employed to search for summarization marks (e.g., world-marks) within a record. In one example, the search engine 702 enables a user to establish criteria (e.g., query) by which to search a record. For example, criteria can be defined by keywords, either typed or spoken. By way of specific example, a user can search for project XYZ. As a result, the system can render a number of summarized entries based upon relevance to the project XYZ. As well, these results can be based upon 'world-marks' or tags as appropriate or available.

The configuration component 704 enables the summarization to be configured in accordance with the identity of the viewer. As stated earlier, the summarization can be personalized based upon the viewer 'identity' which includes actual identity as well as role, capacity, interests, knowledge, etc. Additionally, the configuration component 704 can configure the summary based upon a target device. For example, the rendering of a summary could be different if presented on a smart-phone versus a desktop computer. Here, the configuration component 704 can automatically assess the specifications of the target device and configure, arrange, size, etc. the data accordingly for presentation to a viewer.

Figure 8:
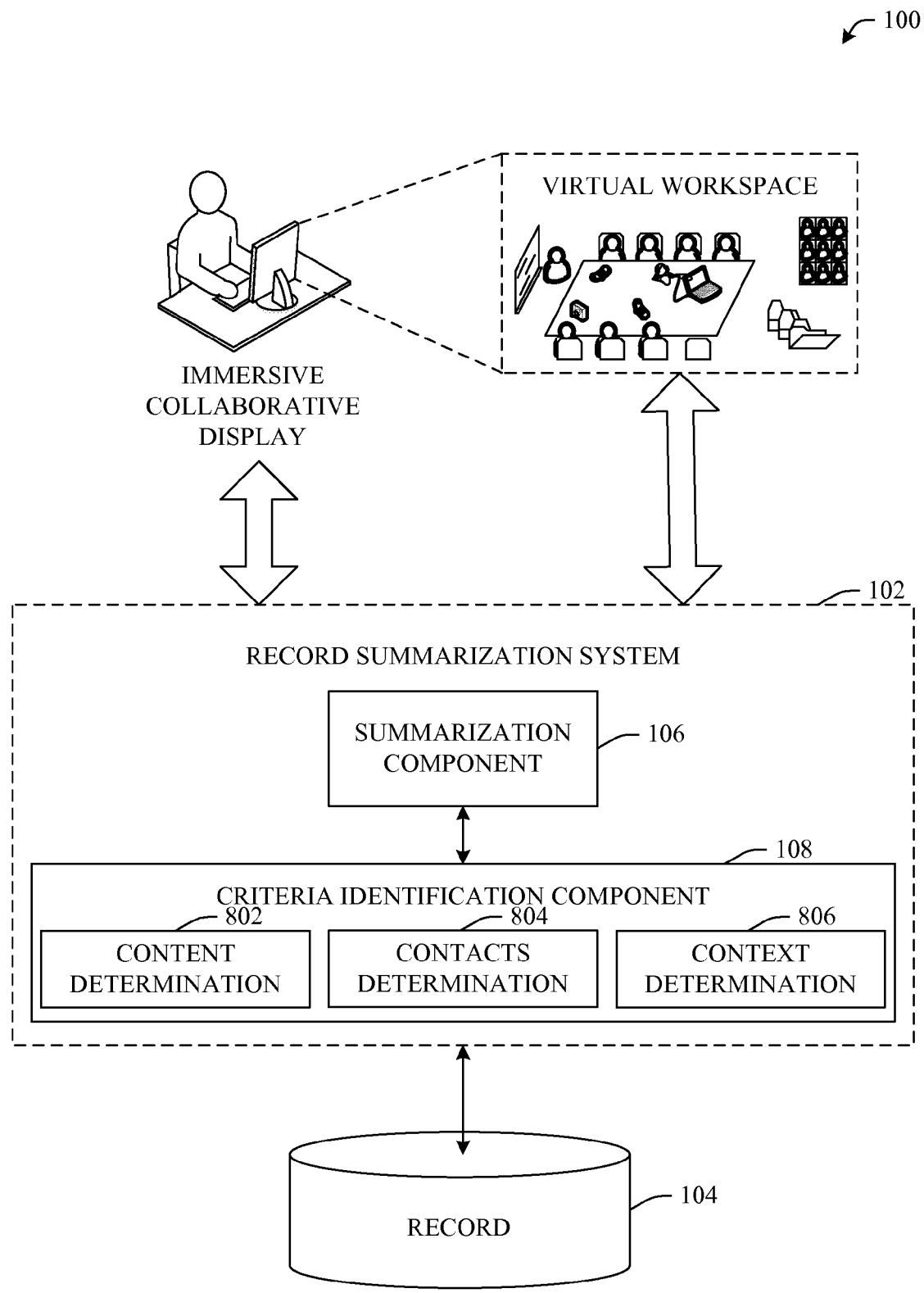
FIG. 8 illustrates an example record summarization system that employs a content determination component, a contacts determination component and a context determination component that facilitate effective summarization in accordance with the specification.

Turning now to FIG. 8, a block diagram of an alternative system 100 is shown in accordance with aspects. In particular, as shown, criteria identification component 108 can include a content determination component 802, a contacts determination component 804 and/or a context determination component 806. Together these sub-components can identify criteria either from a virtual environment in real-time (or near real-time) or from an existing record 104. This criterion can be used to establish summarization markers as well as summarized clips associated with the virtual workspace.

The content determination component 802 can establish the subject of discussion within a virtual environment. For example, speech recognition, text analyzers, pattern recognition or the like can be employed to gather information about the virtual workspace. Accordingly, this information can be processed and further analyzed to establish the content of the virtual workspace.

Similarly, the contacts determination component 804 can employ voice recognition as well as pattern recognition to identify presence of contacts within the environment. This presence information can be used to further analyze the factors surrounding the discussions within the virtual environment. For example, commonalties can be drawn between contacts such that it can be possible to increase probabilities of determining a topic of discussion (e.g., either in real-time, near real-time or from the record). By way of example, suppose there are three participants presents in an immersive collaborative discussion, it can be determined that these three individuals are members of the team for Project XYZ, thus, it can be determined that there is a high probability that the discussion is centered around Project XYZ. This determination (or inference) can be supplemented with other information such as, content as determined by the content determination component 802.

The context determination component 806 can be used to establish other contextual factors associated with the virtual environment. For example, the context determination component 806 can establish time, date, day of week, location, engaged activity, participant mood, urgency, knowledge, etc. associated with the discussion. This context information can be used to further provide deterministic information to the summarization component 106 by which summarization markers as well as summary portions can be selected, established or inferred. While specific contextual factor examples are described, it is to be understood that these have been provided to add perspective to the innovation and are not intended to limit the innovation in any manner. As such, countless examples exist, all of which are to be included within the scope of this disclosure and claims appended hereto.

Figure 9:
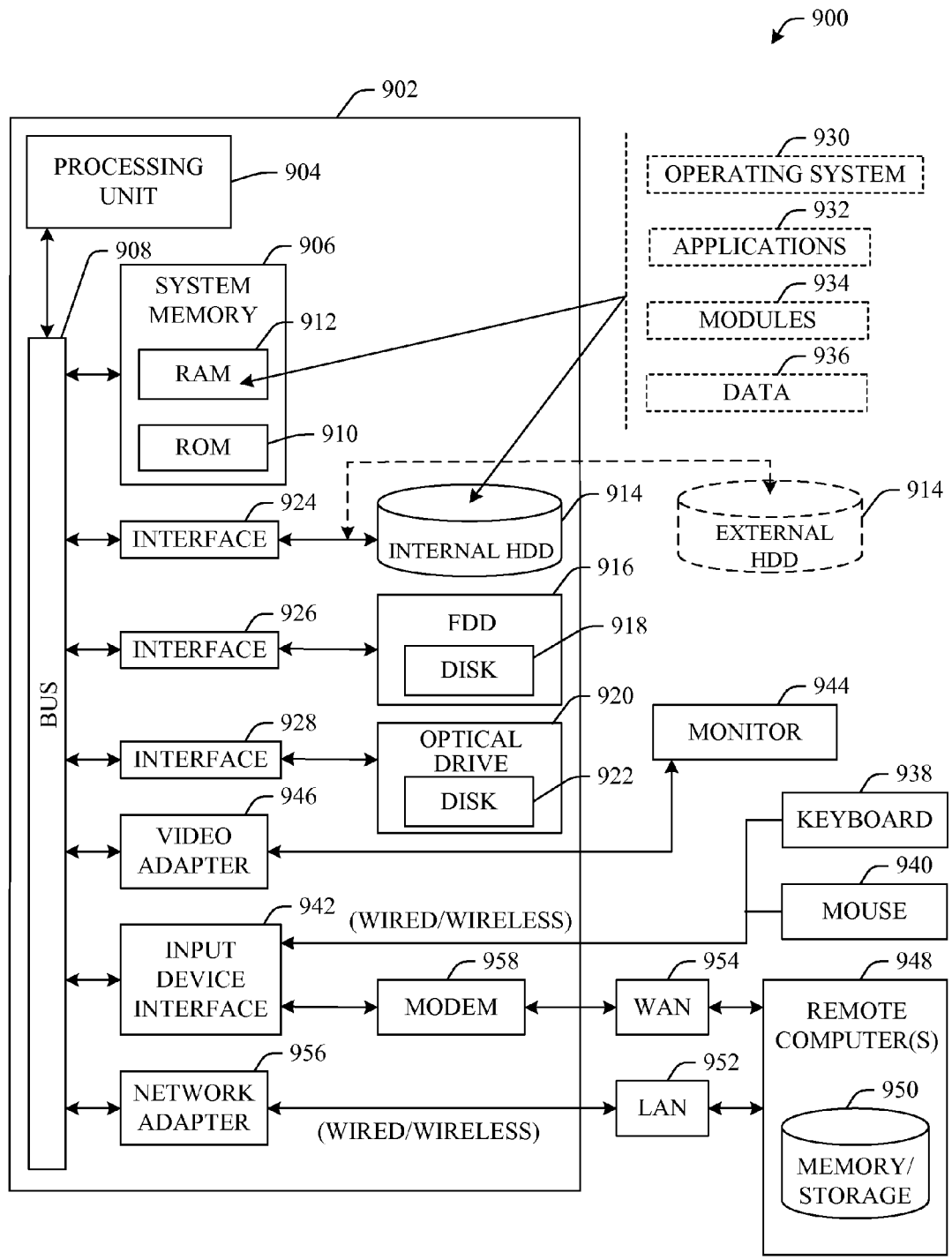
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
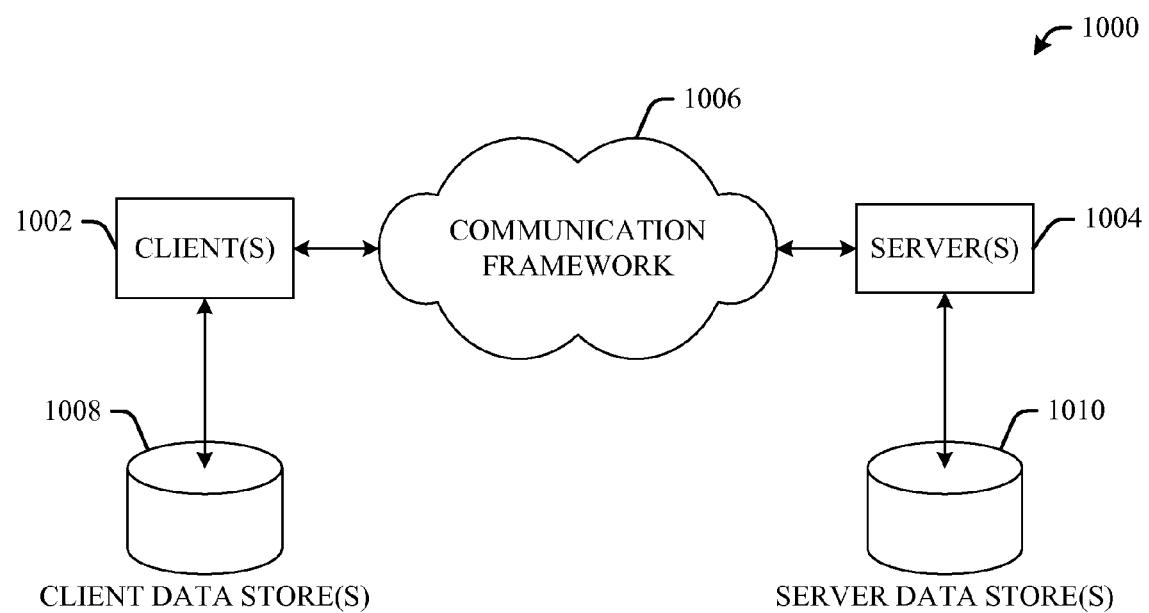
FIG. 10 illustrates a schematic block diagram of an exemplary computing environment in accordance with the subject specification.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices). The client(s) 1002 can house cookie(s) and/or associated contextual information by employing the innovation, for example.

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a computer configured to implement,
    recording a display of a virtual workplace that depicts one or more users performing a business task in the virtual workspace;
    a criteria identification component that establishes a plurality of parameters associated with a collaborative discussion within the recorded display of the virtual workspace; and
    a summarization component that marks a portion of the collaboration discussion within the recorded display of the virtual workspace based upon a subset of the parameters.

2. The system of claim 1, wherein the collaborative discussion relates to a plurality of events within a virtual spatial representation of a business process workflow.

3. The system of claim 1, wherein the plurality of parameters are at least one of content-, contacts-, or context-based parameters.

4. The system of claim 1, wherein the summarization component marks the portion of the collaboration discussion in real-time.

5. The system of claim 1, wherein the portion of the collaboration discussion represents completed events which are maintained in a record.

6. The system of claim 1, the summarization component factors user identity in determination of the marks of the portion of the collaborative discussion.

7. The system of claim 1, further comprising a rendering component that configures and presents the portion of the collaboration discussion to a user.

8. The system of claim 1, wherein the summarization component employs a policy to automatically mark the portion of the collaborative discussion.

9. The system of claim 1, further comprising an inference engine that infers the portion of the collaborative discussion based upon at least one of one of historical or statistical analysis.

10. The system of claim 9, further comprising a manual override component that enables a user to deselect a subset of the portion of the collaborative discussion.

11. The system of claim 1, further comprising an identity determination component that establishes identity of a viewer, wherein the identity is factored into selection of the portion of the collaborative discussion.

12. The system of claim 1, further comprising a search engine component that enables a user to locate a subset of the portion of the collaborative discussion from a record.

13. A computer-implemented method for summarizing a time-based historical record, comprising:

accessing, using a computer, a portion of the time-based historical record that depicts one or more users performing a business task in the virtual workspace, wherein the time-based historical record represents a chronology of events within a virtual workspace;

inferring, using a computer, a plurality of significant events within the time-based historical record; and summarizing, using a computer, the plurality of significant events.

14. The computer-implemented method of claim 13, further comprising:

determining if the inferred plurality of significant events are accurate; and tagging the plurality of accurate significant events.

15. The computer-implemented method of claim 13, further comprising determining at least one of content, contacts and context associated with the time-based historical record, wherein the at least one of content, contacts and context is employed to infer the plurality of significant events.

16. The computer-implemented method of claim 15, further comprising establishing 'identity' of a user, wherein the 'identity' of the user is employed in to infer the plurality of significant events.

17. A computer-executable system, comprising:

a computer system configured to implement, a display of a virtual workplace recorded in a computer readable device that depicts one or more users performing a business task in the virtual workspace;

means for monitoring a plurality of events within the record of the virtual environment; and means for establishing a plurality of events of interest within the record of the virtual environment; and means for marking a subset of the plurality of the events of interest within the record of the virtual environment.

18. The computer-executable system of claim 17, further comprising means for rendering the subset of the plurality of the events of interest.

19. The computer-executable system of claim 17, further comprising means for determining 'identity' of a viewer, wherein the 'identity' of the viewer is employed in establishing the plurality of events of interest.

20. The computer-executable system of claim 17, further comprising means for establishing at least two of content, contacts, or context, wherein the at least two of content, contacts or context are employed in establishing the plurality of events of interest.

\* \* \* \* \*

UNITED STATES PATENT AND TRADEMARK OFFICE
CERTIFICATE OF CORRECTION

PATENT NO. : 8,095,595 B2  Page 1 of 1
APPLICATION NO. : 12/112717
DATED : January 10, 2012
INVENTOR(S) : Lisa L. Bobbitt et al.

It is certified that error appears in the above-identified patent and that said Letters Patent is hereby corrected as shown below:

In column 16, line 55, in Claim 6, delete "the" and insert -- wherein the --, therefor.

In column 16, line 66, in Claim 9, delete "one of one of" and insert -- one of --, therefor.

Signed and Sealed this
Eleventh Day of September, 2012

David J. Kappos
*Director of the United States Patent and Trademark Office*